United States Patent [19]

Tanaka

[11] Patent Number: 4,935,608

[45] Date of Patent: Jun. 19, 1990

[54] CARD AUTHORIZATION TERMINAL SYSTEM IN WHICH ONE TERMINAL TRANSMITS DATA TO A DESIGNATED OTHER TERMINAL

[75] Inventor: Toshifumi Tanaka, Kyoto, Japan

[73] Assignee: Omron Tateisi Electronics Co., Kyoto, Japan

[21] Appl. No.: 175,360

[22] Filed: Mar. 30, 1988

[30] Foreign Application Priority Data

Apr. 1, 1987 [JP] Japan ................................. 62-81805

[51] Int. Cl.⁵ ........................ G06F 15/30; G06F 15/21
[52] U.S. Cl. ...................................... 235/380; 902/22;
902/39; 364/401; 364/405
[58] Field of Search ............... 235/375, 379, 380, 382;
902/22, 37, 39; 340/825.31; 364/400, 401, 405,
406, 408

[56] References Cited

U.S. PATENT DOCUMENTS

| | | | |
|---|---|---|---|
| 4,017,835 | 4/1977 | Randolph | 235/380 |
| 4,319,326 | 3/1982 | Uchida | 364/405 |
| 4,468,750 | 8/1984 | Chamoff et al. | 364/405 |
| 4,502,120 | 2/1985 | Ohnishi et al. | 364/405 |
| 4,630,200 | 12/1986 | Ohamae et al. | 235/380 |
| 4,639,889 | 1/1987 | Matsumoto et al. | 235/379 |
| 4,683,536 | 7/1987 | Yamamoto | 235/380 |
| 4,771,382 | 9/1988 | Shiono et al. | 364/405 |

Primary Examiner—Alan Faber
Assistant Examiner—Robert A. Weinhardt
Attorney, Agent, or Firm—Stevens, Davis, Miller & Mosher

[57] ABSTRACT

A card authorization terminal in which a plurality of CATs (card authorization terminals) are connected to a data transmission line. At least one of the CATs comprises: a memory from/into which data can be read out and written; a data transmitting circuit to transmit and receive the data through the data transmission line; a transmission instructing device through which an operator instructs transmission of data to another designated CAT; and a controller for reading out the storage data from the memory in response to an output of the transmission instructing device, and for transmitting the read out data to the designated CAT by the transmitting circuit. The designated CAT includes a controller for storing the reception data into the memory in response to the reception of the data transmitted from the one CAT.

6 Claims, 6 Drawing Sheets

CARD AUTHORIZATION TERMINAL SYSTEM IN WHICH ONE TERMINAL TRANSMITS DATA TO A DESIGNATED OTHER TERMINAL

BACKGROUND OF THE INVENTION

1. Field of the Invention

The present invention relates to a card authorization terminal system and, more particularly, to a card authorization terminal system in which a plurality of card authorization terminals are connected to a data transmission line and the data transmission is mutually performed through the data transmission line.

2. Description of the Related Background Art

In recent years, in association with the widespread use of credit cards, a card authorization terminal system including a terminal called a CAT (credit authorization terminal) has been put into practical use to automate the authorization of the credit card.

A plurality of CATs are installed in a supermarket, department store, or the like. These CATs are connected to a card authorization terminal group management apparatus called a cluster controller to manage a group of CATs through a LAN (local area network) provided in the store. The cluster controller is connected to a host computer in a card company through a transmission line. The card authorization data input from the CAT is transmitted to the host computer through the cluster controller on-line and processed by the host computer in a realtime manner. The host computer checks to see if the transaction can be performed or not. The result of the discrimination is sent to the CAT through the cluster controller.

However, hitherto, the necessary data or program is set into a memory provided in the CAT by the down line loading (hereinafter, abbreviated to DLL) from the cluster controller. The DLL denotes that data, command, program, and the like are loaded from the apparatus on the higher order side to the apparatus on the lower order side.

Hitherto, to set data or program into the CAT by the DLL from the cluster controller, the data or program is first input from a keyboard of the CAT or a console of the cluster controller and must be set in a memory in the cluster controller. Next, the DLL must be performed from the cluster controller to the CAT. The two kinds of setting operations are needed. Therefore, it is troublesome to perform such operations and there is a fear such that the data or program is erroneously set by the misoperation.

SUMMARY OF THE INVENTION

It is an object of the present invention to provide a card authorization terminal system in which data transmission can occur among a plurality of card authorization terminals without passing through any apparatus, so that data or the like can be easily set.

According to the invention, this object is accomplished by a card authorization terminal system in which a plurality of card authorization terminals are connected to a data transmission line and the data transmission is mutually executed through the data transmission line, wherein at least one terminal comprises: memory means from and into which data can be read out and written; data transmitting means for transmitting and receiving the data through the data transmission line; transmission instructing means through which an operator instructs the transmission of the data; and control means for reading out the storage data from the memory means in accordance with an output of the transmission instructing means, and for transmitting this data to at least one other card authorization terminal by the data transmitting means.

Each other terminal comprises: the memory means; the transmitting means; and control means for writing reception data into the memory means in response reception of data transmitted from the one card authorization terminal.

According to a card authorization terminal system of the invention, a plurality of card authorization terminals are connected to the data transmission line, and the data read out of the memory means of one of the card authorization terminals is transmitted to the other card authorization terminal through the data transmission line and written into the memory means in the other card authorization terminal. Therefore, data or the like can be easily set without passing through any apparatus such as the cluster controller.

DETAILED DESCRIPTION OF THE PREFERRED EMBODIMENT

Figure 1:
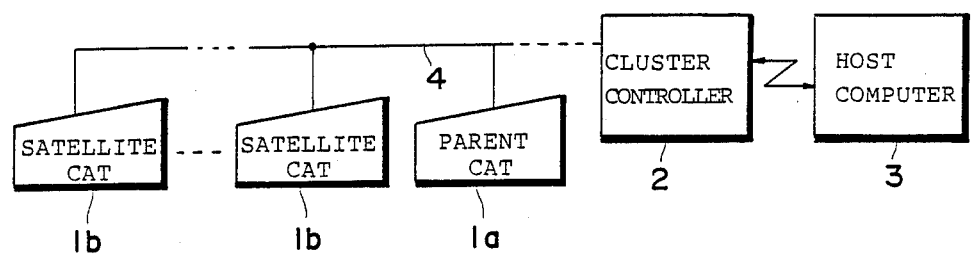
FIG. 1 is a diagram showing an arrangement of a transaction processing system which is constituted so as to include a CAT in an embodiment of the present invention.

FIG. 1 is a diagram showing an arrangement of a transaction processing system to which a card authorization terminal system in an embodiment of the present invention is applied. In FIG. 1, this transaction processing system comprises a plurality of CATs 1, a cluster controller 2, and a host computer 3. The CATs 1 are provided to authorize cards. At least one of the CATs 1 functions as a parent CAT (1a) serving as a transmitting side when data or the like is set. The other CATs 1 function as satellite CATs (1b) which receive the data transmitted from the parent CAT 1a and store it. In this embodiment, for example, all of the fifteen CATs 1 connected to a data transmission line 4 have both of the functions of the parent CAT 1a and sattellite CAT 1b. Therefore, there is an advantage such that when data is set into an arbitrary CAT, by merely performing the DLL (down line loading), the same data can be set into the other CATs.

The cluster controller 2 has a function to manage the CATs 1 and allows the data transmission to be executed among the CATs 1 and the host computer 3. The group of CATs 1 and the cluster controller 2 can be connected by the data transmission line 4. However, in the case of performing the DLL among the CATs 1, there is no need to connect the cluster controller 2 therewith. In this embodiment, an address of each apparatus is used to indicate the reception side and transmitting side. The address is expressed by a hexadecimal numbers. For example, "00" is assigned to the cluster controller 2. "01" is assigned to the parent CAT 1a. "02" to "OF" are assigned to fourteen satellite CATs 1b. The other addresses may be also assigned. The host computer 3 receives the authorization data from the CAT 1 and discriminates whether this data can be authorized or not. Then, the host computer 3 sends the result of the discrimination to the relevant CAT.

Figure 2:
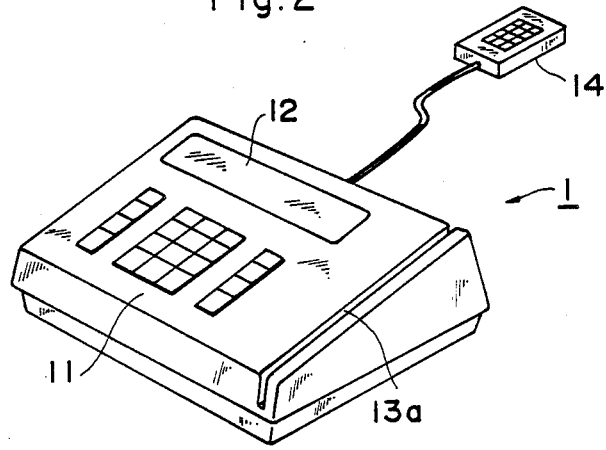
FIG. 2 is an external perspective view of the CAT shown in FIG. 1.

FIG. 2 is an external perspective view of the CAT 1 shown in FIG. 1. In FIG. 2, the main unit of the CAT 1 has a keyboard 11, a display device 12 and a card reader 13 (a manual scanning groove of the card is indicated at 13a). A PIN (personal identification number) pad 14 is connected to the CAT 1. As will be explained hereinlater with reference to FIG. 3, the keyboard 11 includes keys to input set data and to instruct the DLL of the set data. The display device 12 displays the characters to guide the operations, the data input by the keyboard 11, and the like. The card reader 13 reads the card data from a customer's credit card. The PIN pad 14 is used for a customer to input his personal identification secret number.

Figure 3:
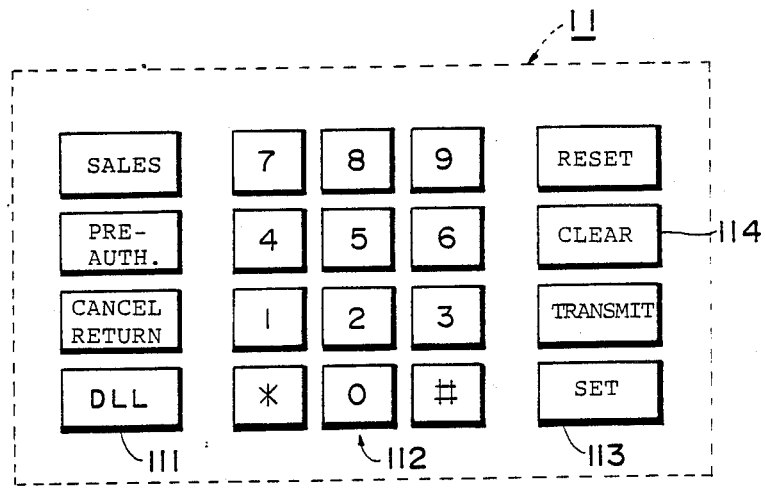
FIG. 3 is a diagram showing a key arrangement on a keyboard in the CAT shown in FIG. 2.

FIG. 3 is a diagram showing a key arrangement on the keyboard shown in FIG. 2. In FIG. 3, the keyboard 11 has a DLL key 111, ten-keys 112, a set key 113, and a clear key 114. The DLL key 111 is operated when the DLL is performed for another CAT. The ten-keys 112 and set key 113 are operated when the CAT on the reception side is instructed. The clear key 114 is operated when the operating mode is returned to the initial state after completion of the DLL.

Figure 4:
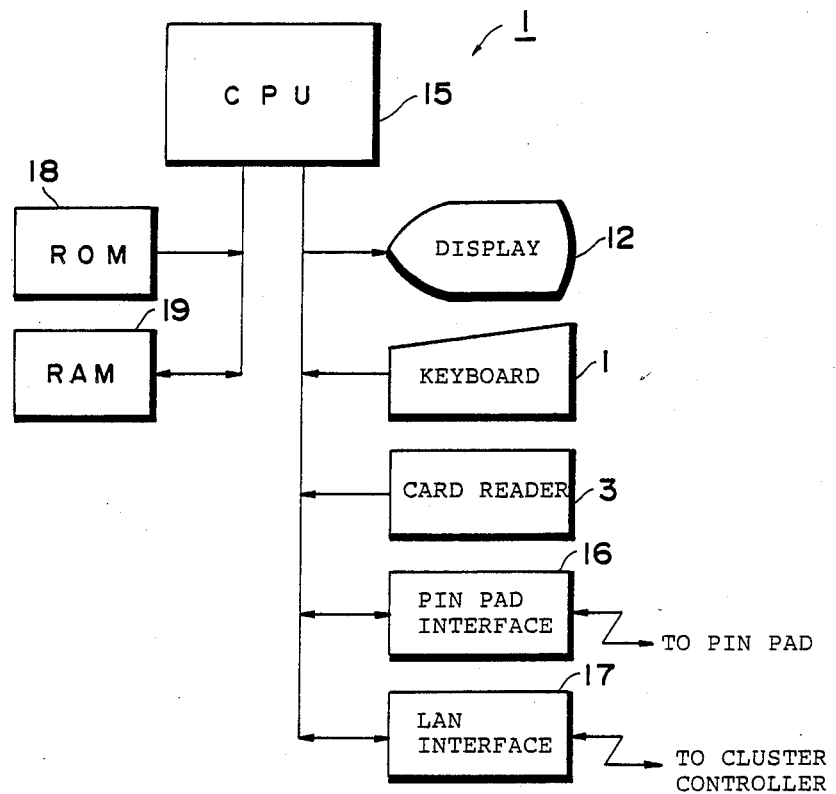
FIG. 4 is a schematic block diagram showing an electrical arrangement of the CAT shown in FIG. 2.
Figure 8:
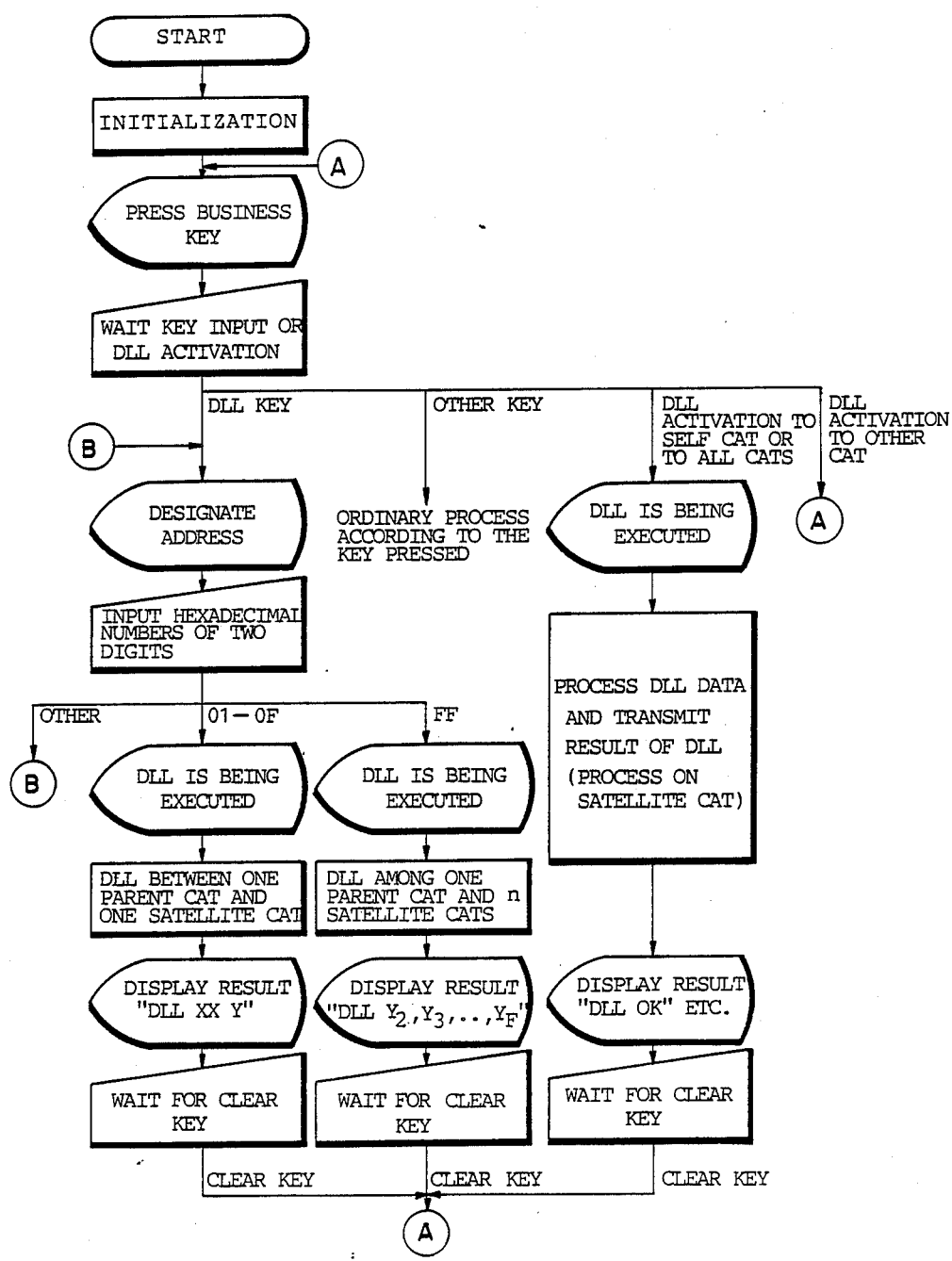
FIG. 8 is a flowchart for explaining the operation of the CAT of the embodiment of the invention.

FIG. 4 is a schematic block diagram showing an electrical arrangement of the CAT 1 shown in FIG. 2. In FIG. 4, the CAT 1 has a CPU 15. The foregoing keyboard 11, display device 12, and the card reader 13 are connected to the CPU 15. Further, a PIN pad interface 16, and LAN interface 17, an ROM 18, and an RAM 19 are also connected to the CPU 15. The PIN pad 14 is connected to the PIN pad interface 16. The LAN interface 17 is connected to the cluster controller 2 through the data transmission line 4. An operation program for the CPU 15 executed based on a flowchart as shown in FIG. 8, which will be explained hereinlater, is stored in the ROM 18. When the CAT 1 functions as the parent CAT 1a, the data to be transmitted to the satellite CATs 1b is stored in the RAM 19. When the CAT 1 functions as the satellite CAT 1b, the data transmitted from the parent CAT 1a or the like is stored in the RAM 19.

Figure 5:
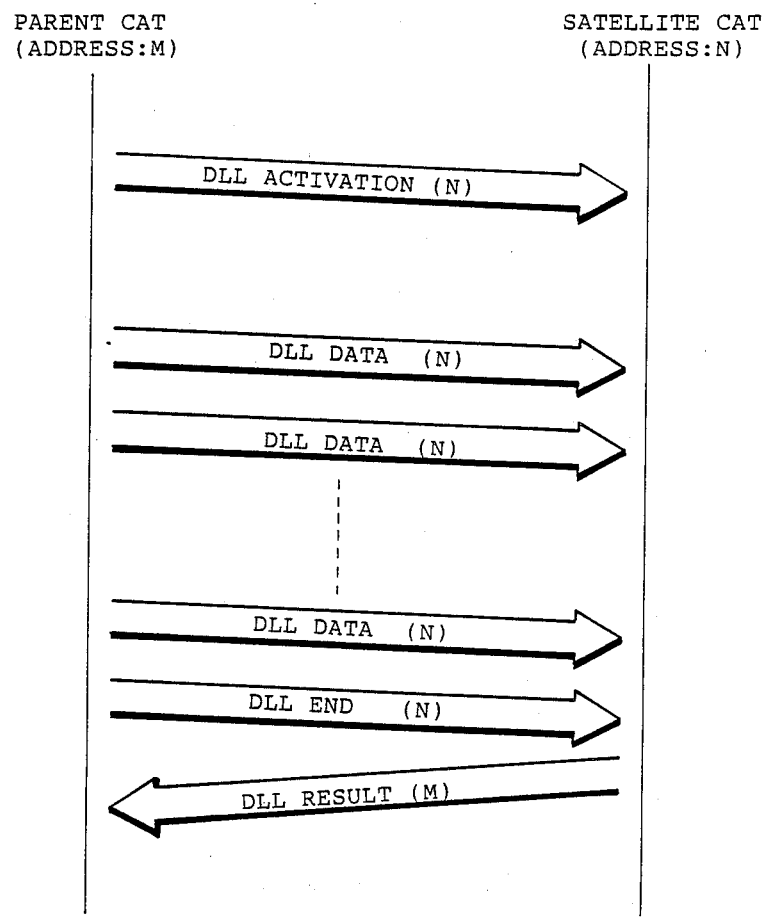
FIGS. 5 and 6 are diagrams showing flows of messages which are transmitted and received between a parent CAT and a satellite CAT.
Figure 6:
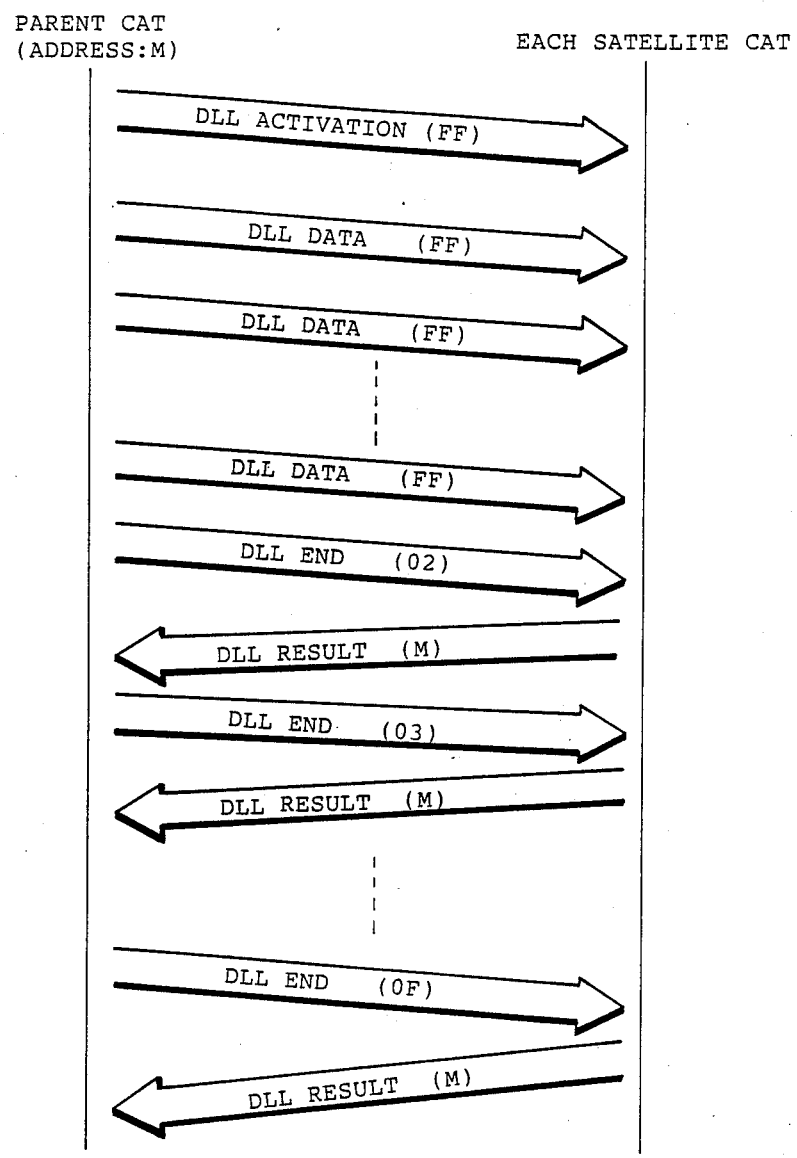

FIGS. 5 and 6 are diagrams showing flows of messages which are transmitted and received between the parent CAT 1a and the satellite CATs 1b. Particularly, FIG. 5 shows the case where the DLL is performed from one parent CAT to one satellite CAT. FIG. 6 shows the case where the DLL is executed from one parent CAT to all of the other satellite CATs.

When the DLL is performed between one parent CAT and one satellite CAT, as shown in FIG. 5, the address (in this case, N) of the satellite CAT is designated and a DLL activation message is transmitted. Thereafter, the messages including the data to be set and stored into the satellite CAT (hereinafter, this data is referred to as DLL data) are sequentially transmitted. After completion of the transmission of the DLL data, the parent CAT transmits a DLL end message to the satellite CAT. In response to the reception of the DLL end message, the satellite CAT designates the address (in this case, M=01) of the parent CAT and transmits the message indicative of the result of the DLL to the parent CAT.

When the DLL is executed to all of the satellite CATs among one parent CAT and n satellite CATs, as shown in FIG. 6, the address of the satellite CAT (in this case, the address "FF" to designate all of the satellite CATs is used) is designated and the DLL activation message is transmitted. Thereafter, the messages including the DLL data are sequentially transmitted to all of the satellite CATs. After completion of the transmission of the DLL data, the parent CAT first transmits the DLL end message to the satellite CAT of the address "02". When the DLL result message is sent from the satellite CAT of the address "02", the parent CAT then transmits the DLL end message to the satellite CAT of the address "03". In this manner, the DLL end messages are sequentially transmitted to the satellite CATs.

Figure 7A:
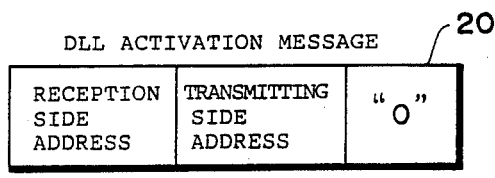
FIGS. 7a to 7d are diagrams showing formats of the messages shown in FIGS. 5 and 6.
Figure 7B:
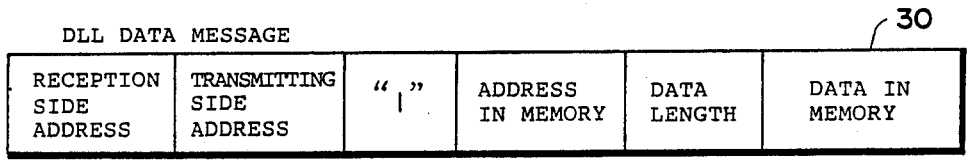
Figure 7C:
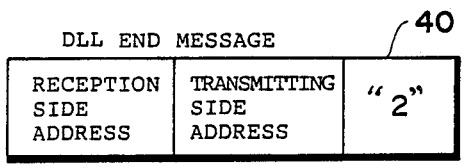
Figure 7D:
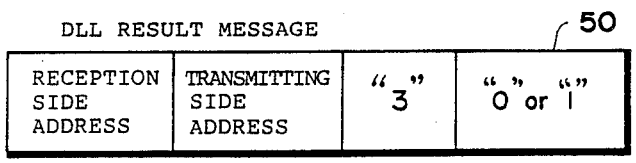

FIGS. 7a to 7d are diagrams showing a format of each message which is used in the operations shown in FIGS. 5 and 6. Particularly, FIG. 7a shows a DLL activation message. FIG. 7b shows a DLL data message. FIG. 7c shows a DLL end message. FIG. 7d shows a DLL result message.

A DLL activation message 20 shown in FIG. 7a comprises a reception side address, a transmitting side address, and a code "0" indicative of the DLL activation message. If the reception side address is one of "01" to "OF", this means that the message is transmitted to one of the satellite CATs 1b shown in FIG. 1. If the reception side address is "FF", this means that the message is transmitted to all of the satellite CATs 1b.

A DLL data message 30 shown in FIG. 7b comprises a reception side address, a transmitting side address, a code "1" indicative of the DLL data message, an address in the memory, a data length, and data in the memory. The address in the memory is the information to designate the storage area in the memory of the satellite CAT. The data length represents the length of data in the memory which is set. The data in the memory denotes the memory content which is set into the satellite CAT by the DLL.

A DLL end message 40 shown in FIG. 7c comprises a reception side address, a transmitting side address, and a code "2" indicative of the DLL end message.

A DLL result message 50 shown in FIG. 7d comprises a receiption side address, a transmitting side address, a code "3" indicative of the DLL result message, and a code "0" or "1" representative of the result of the DLL. The code "0" indicative of the result of the DLL means that the DLL has normally been finished. The code "1" denotes that an abnormality occurred in the DLL.

FIG. 8 is a flowchart for explaining the operation of the CAT to which the embodiment of the invention is applied. The operation of the CAT to which the embodiment of the invention is applied will now be described in detail with reference to FIGS. 1 to 8.

The CPU 15 first performs the initialization. Then, a guide sentence "Please press a business key" is displayed by the display device 12. Next, the terminal waits until a key is input or the DLL activation message 20 from another CAT is received.

When an operator performs the DLL by using the CAT which is at present being operated as the parent CAT, he or she presses the DLL keys 111 of the keyboard 11. In response to the key depression, the CPU 15 displays a guide sentence "Please designate an address" by the display device 12. To designate an address, the ten-keys 112 are operated to input hexadecimal numbers of two digits, and the set key 113 is subsequently pressed. When either one of the addresses "01" to "OF" is designated, the CPU 15 allows the display device 12 to display the information indicating that the DLL is being performed. The DLL is executed between one parent CAT and one satellite CAT as shown in FIG. 5. Subsequently, the result of the DLL is displayed on the display device 12 by displaying the characters "DLL", the reception side address "XX", and the code "Y" indicative of the result of the DLL in accordance with this order. If Y is set to "0", this means that the DLL has normally been finished. If Y is set to "1", this means that the abnormality occurred in the DLL. If Y is set to "2", this means that the DLL result message 50 is not received. After that, the CPU 15 waits until the clear key is input. When the clear key 114 is operated, the operating mode is returned to the initial state.

On the other hand, if "FF" is designated as the reception side address, the CPU 15 allows the display device 12 to display the information indicating that the DLL is being executed. Then, the DLL is executed among one parent CAT and n satellite CATs as shown in FIG. 6. After that, the CPU 15 displays the result of the DLL by the display device 12 by displaying, for example, the characters "DLL" and the codes $Y_2, Y_3, \ldots, Y_F$ indicative of the result of the DLL in each CAT. If $Y_n$ (n=1 to F) is set to "0", this means that the DLL has normally been completed. If $Y_n$ is set to "1", this means that the abnormality occurred in the DLL. If $Y_n$ is set to "2", this means that the DLL result message 50 is not received. Subsequently, the CPU 15 waits until the clear key is input. When the clear key 114 is operated, the operating mode is returned to the initial state.

The operation of the satellite CAT will now be explained. The operation of the satellite CAT is similar to the foregoing parent CAT until the process for initialization or the state in which the CPU 15 waits for the key input or the activation of the DLL; therefore, the description of this operation is omitted. When the CPU 15 of the satellite CAT receives the DLL activation message 20 transmitted through the data transmittion line 4, the CPU 15 discriminates whether this message is the DLL activation message to the self CAT or to all of the CATs or not on the basis of the receiption side address included in the DLL activation message 20. If it is the DLL activation message to the self CAT or to all of the CATs, the information indicating that the DLL is being executed is displayed on the display device 12. Then, the DLL data message 30 sent from the parent CAT is received. The transmitted data is written into the memory area which is designated by the address in the memory included in the DLL data message 30. When the DLL end message 40 is transmitted from the parent CAT, the DLL result message 50 is transmitted to the parent CAT through the data transmission line 4. Then, the CPU 15 allows the display device 12 to display the result by displaying, for example, "DLL OK" or "DLL NG". Next, the CPU 15 waits until the clear key is input. When the clear key 114 is pressed, the operating mode is returned to the initial state.

On the other hand, when the DLL activation message 20 transmitted from the parent CAT through the data transmittion line 4 is not the DLL activation message to the self CAT but the DLL activation message to another CAT, the CPU 15 further waits until a key is input or until the DLL is activated.

As described above, according to this invention, a plurality of CATs are connected to the data transmission line and the data read out of the memory means of parent CAT is transmitted to satellite CAT through the data transmission line and written into the memory means in this satellite CAT. Thus, the data or the like can be easily set without passing through any apparatus.

What is claimed is:

1. A card authorization terminal system comprising:
   a data transmission line;
   a plurality of card authorization terminals connected to said data transmission line and;
   a terminal group management apparatus connected to said plurality of terminals, via said data transmission line, said group management apparatus managing data communications between said terminals and a host computer for a card authorization processing initiated at one of said terminals, at least one of said terminals being able to send data to another one of said terminals without the data passing through the group management apparatus, said at least one terminal comprising:
   memory means from which and into which data can be read out and written;
   data transmitting means for transmitting and receiving data through the data transmission line;
   transmission instructing means through which an operator instructs the transmission of data to said another one of said terminals; and
   control means for reading out the storage data from said memory means in accordance with an output of said transmission instructing means, and for controlling said data transmitting means to transmit said read out storage data to said another one of said terminals.

2. A system according to claim 1, wherein each other terminal comprises an associated memory means from which and into which data can be read out and written, a data transmitting means for transmitting and receiving data through the data transmission line, and a control means for storing received data into its said associated memory means in response to reception of the data transmitted from said at least one card authorization terminal.

3. A system according to claim 1, wherein said transmission instructing means includes means for designating for data reception said another one of said terminals, said control means of said at least one terminal controlling said data transmitting means to transmit said read out storage data to said another one of said terminals.

4. A system according to claim 3, wherein said at least one of said terminals is able to send data to all other ones of said terminals without the data passing through the group management apparatus and said means for designating can designate all other ones of said card authorization terminals for data reception, and said control means controls said data transmitting means to transmit the read out storage data to all of the designated card authorization terminals.

5. A system according to claim 3 wherein said designating means includes a key means.

6. A system according to claim 4 wherein said designating means includes a key means.

* * * * *